United States Patent [19]
Bishop et al.

[11] Patent Number: 6,159,886
[45] Date of Patent: Dec. 12, 2000

[54] CLAY COMPOSITION CONTAINING A TANNIN AND A METHOD FOR PRODUCING BRICKS THEREFROM

[75] Inventors: Marshall D. Bishop; Orval G. Ward; Lowell A. Gray; Earnest W. McNickle, all of Bartlesville, Okla.

[73] Assignee: Phillips Petroleum Company, Bartlesville, Okla.

[21] Appl. No.: 09/362,226

[22] Filed: Jul. 28, 1999

[51] Int. Cl.[7] .............................. C04B 33/04; C04B 33/14
[52] U.S. Cl. ...................... 501/141; 501/148; 106/486; 106/487
[58] Field of Search .................................. 501/141, 148, 501/133; 106/416, 486, 487

[56] References Cited

U.S. PATENT DOCUMENTS

| | | | |
|---|---|---|---|
| 722,791 | 3/1903 | Goodrich | 501/141 |
| 4,377,414 | 3/1983 | Buschmann et al. | 106/85 |
| 4,440,228 | 4/1984 | Swanson | 166/274 |
| 4,473,654 | 9/1984 | Stendera | 501/108 |
| 4,912,069 | 3/1990 | Ruben | 501/148 |
| 5,047,182 | 9/1991 | Sundback et al. | 264/28 |
| 5,110,839 | 5/1992 | Chao | 521/83 |
| 5,424,283 | 6/1995 | Miano et al. | 507/109 |
| 5,464,060 | 11/1995 | Hale et al. | 166/293 |
| 5,496,392 | 3/1996 | Sims et al. | 75/414 |
| 5,641,584 | 6/1997 | Andersen et al. | 428/703 |
| 5,755,295 | 5/1998 | Hayatdavoudi et al. | 175/65 |
| 5,807,798 | 9/1998 | Bolt et al. | 501/133 |

*Primary Examiner*—Michael Marcheschi
*Attorney, Agent, or Firm*—Richmond, Hitchcock, Fish & Dollar

[57] ABSTRACT

A composition of clay, water and an additive chosen from the group consisting of tannin, modified tannin and mixtures thereof. A clay brick made from a composition of clay, water and an additive chosen from the group consisting of tannin, modified tannin and mixtures thereof. A method for producing clay bricks in which a composition comprising clay, water and an additive chosen from the group consisting of tannin, modified tannin and mixtures thereof is prepared. A clay brick made by a method in which a composition comprising clay, water and an additive chosen from the group consisting of tannin, modified tannin and mixtures thereof is prepared. A method for producing brick in which the water content necessary to facilitate the extrusion of a plastic mixture of clay and water is reduced by incorporating an additive chosen from the group consisting of tannin, modified tannin and mixtures thereof into the plastic mixture of clay and water.

40 Claims, 2 Drawing Sheets

CLAY COMPOSITION CONTAINING A TANNIN AND A METHOD FOR PRODUCING BRICKS THEREFROM

FIELD OF THE INVENTION

This invention relates to the production of clay bricks, a composition used in the production of clay bricks, a method for producing bricks using the before-mentioned composition and the bricks produced from the composition and by a method using the composition.

BACKGROUND OF THE INVENTION

Making bricks from clay is an age-old art that is practiced worldwide. Brick making ranges from ancient, entirely manual processes to modern, highly sophisticated, automated, mechanical processes. All of the processes involve mining a suitable shale or clay, crushing and/or grinding the mined material to an appropriate size, mixing the sized material with sufficient water to form a composition that is suitably plastic to form green brick (unfired brick), forming the green brick, drying the green brick and kiln firing the green brick to produce a finished brick. Modern processing has added machinery that not only eliminates the manual mixing of the brick composition but also extrudes the composition and cuts the extrusion into appropriate lengths.

In the practice of brick making the moisture content of the green brick is critical. A moisture content that is too high can cause low green strength, deformation during stacking, extended drying time and greater shrinkage during firing. A moisture content that is too low can cause insufficient plasticity for proper extrusion or, if successfully extruded, can result in a green brick without enough cohesiveness to withstand the rigors of processing so that it crumbles during further processing.

SUMMARY OF THE INVENTION

It is therefore an object of this invention to provide a composition comprising clay and tannins and/or modified tannins which improves the extruding and drying operations in the production of brick as compared to such extruding and drying operations using a composition without the inclusion of tannins and/or modified tannins in the composition.

It is another object of this invention to provide a process using a composition comprising clay and tannins and/or modified tannins which improves the extruding and drying operations in the production of brick as compared to such extruding and drying operations using a composition without the inclusion of tannins and/or modified tannins in the composition.

It is still another object of this invention to provide a clay brick made of the composition set out in this invention and to provide a clay brick made by the process set out in this invention.

It is also an object of this invention to provide a method for producing brick in which the water content necessary to facilitate the extrusion of a plastic mixture of clay and water is reduced.

Other objects and advantages of the invention will become apparent from the detailed description and the appended claims.

DETAILED DESCRIPTION OF THE INVENTION

The composition of this invention is based on any clay or shale that is suitable for the production of brick. Clay is an earthy or stony mineral aggregate essentially composed of hydrous silicates of alumina that are plastic when sufficiently pulverized and wetted, rigid when dry and vitreous when fired at a sufficiently high temperature. Within this description of clay is a description of the basic process of brickmaking.

Clay is generally found in an unconsolidated, unstratified state on the surface of the earth. Shale is found in thinly stratified, sedimentary state with well-marked cleavage parallel to the bedding. The clay and shale are mined and transported to a facility for processing into brick.

Figure 1:
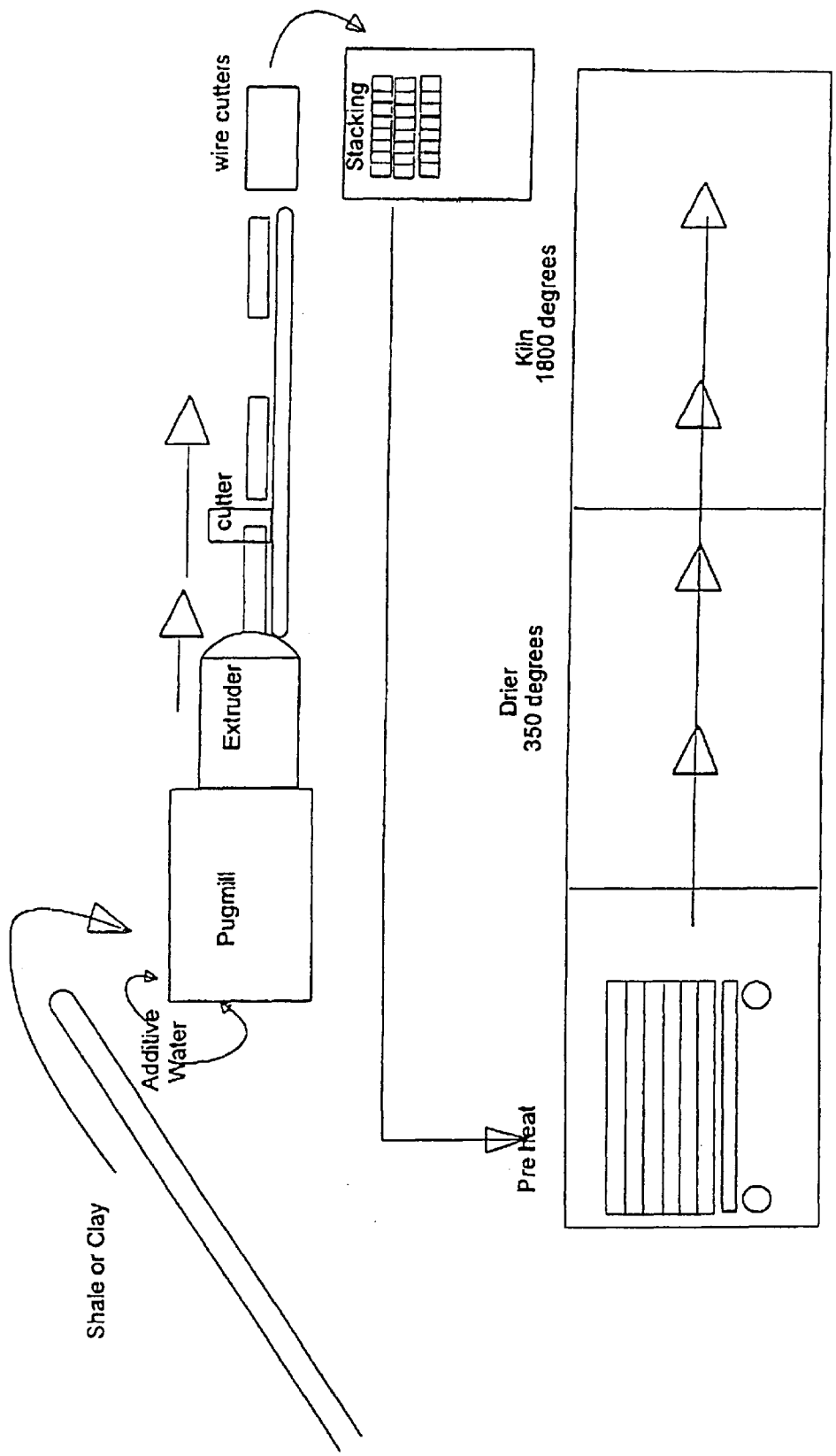
FIG. 1 is a flowsheet of a typical brick production facility which produces brick by extruding aplastic mixture of clay and water.

FIG. 1 is a production flowchart of a typical, modern brick production facility. The shale and/or clay can be at least partially milled and sized prior to introduction along with water into a pugmill wherein it is further milled and masticated with additional water to produce a plastic mass suitable for passage through an extruder thereby providing a column of cohesive wetted clay. These columns are shaped by pushing the plastic clay and/or shale through a die opening that forms the peripheral dimensions of the brick. The columns can be extruded through dies having rods affixed therein which provide core holes through the extrusions. Water is added to the extrusion mixture in a quantity sufficient to permit laminar flow through the extrusion equipment. The present invention adds a combination of water and tannins or modified tannins to provide an extrusion mixture that has a lower water content than would be necessary to attain laminar flow through the extrusion equipment if the tannins or modified tannins were not present. The columns of extrudate are then cut, usually with cutters that are wires that are forced through the columnar extrusion, to provide the third dimension of the green brick.

The green brick is then stacked on conveyances that are continuously moved through a series of progressively more intensely heated treatment areas in which the brick are first preheated to drive off some of their water content and condition them for higher temperatures, then dried by raising their temperature to a range around about 350° F. (177° C.) and then passed through a kiln in which the temperature is maintained at a level above about 1706° F. (930° C.) to produce fired brick. Firing is a function of both time and temperature so that the green brick must be fired for a sufficient time at a sufficient temperature to provide the inter-particulate bond, the strengths, the pore structure and the color that are the required properties of the specifications of a particular product.

This invention is particularly concerned with providing a composition containing an amount of tannin or modified tannin to provide in the brickmaking process an extrusion mixture that has a lower water content than would be necessary to attain laminar flow through the extrusion equipment if the tannins or modified tannins were not present. The lower water content provides green brick that are more efficiently dried thereby increasing the ability to produce fired brick having water content that is sufficiently low that the possibility of brick imperfection or failure, such as cracks in the fired brick, is reduced. It should be noted that, even though the invention is described in terms of modern, extrusion techniques for brick production, the compositions are equally appropriate for brickmaking using tannin or modified tannins in any method of production.

Tannins incorporate a large group of water-soluble, complex organic compounds. Natural tannins are contained in the leaves, roots, bark, wood and fruit of most trees and shrubs. Among the plants containing tannins in their bark are: wattle, mangrove, oak, eucalyptus, hemlock, pine larch and willow. Among tannin containing woods are: quebracho, chestnut oak and urunday. Fruits containing tannins are myrobalans, valonia, divi-divi, tara and algarrobilla. Sumac and gambier have tannins in their leaves and canaigre and palmetto have tannins in their roots. The most preferred source of tannins is quebracho wood. A spray-dried quebracho powder is sold by Unitan as Superior ATO.

The preparation of tannin extracts, particularly wattle and quebracho extracts, is a well-established industrial practice. These extracts are composed of approximately 70 percent polyphenolic tannins, 20 to 25 percent nontannins which are mainly simple sugars, 3 to 6 percent polymeric carbohydrates and the balance being water. Vegetable tannins are not pure chemical components with exact structures but can contain numerous components. Tannin extracts are widely available commercially.

The weight average molecular weight of the multicomponent structures containing phenolic moieties referred to herein as tannins can range from about 300 to about 3000, preferably from about 300 to about 2000 and most preferably from about 500 to about 1500.

Chemical modification of the natural tannins can be accomplished through various chemical reactions. Among the modified tannins for use in this invention are sulfited tannins and sulfomethylated tannins, both of which are available commercially and both of which find well known uses in the well-treating industry and tannins modified through at least one of the reactions of esterification and etherification as shown in U.S. Pat. No. 5,843,337, incorporated herein by reference. The sulfited tannins and the sulfomethylated tannins, particularly sulfited quebracho and sulfomethylated quebracho, are preferred. The sulfomethylated tannins, particularly sulfomethylated quebracho, are currently more preferred.

The compositions useful in this invention are obtained by incorporating into a plastic mixture of water and clay a sufficient amount of an additive consisting essentially of tannins, modified tannins and mixtures thereof to provide an extrudable mixture of clay, water and the additive that on extrusion contains a lesser amount of water than an extrudable mixture of clay and water without the additive. The compositions of this invention provide the viscosity needed to facilitate the process of extruding a plastic mixture of hydrated clay. Without the tannin/modified tannin additive, comparatively more water is required to provide a viscosity to a mixture of clay and water that equals the viscosity of a mixture of clay and water with tannin or modified tannin.

The amount of additive useful in reducing the amount of water needed in the extrudable, hydrated clay compositions of this invention is in the range of about 0.02 pound of additive/short ton of dry clay (0.01 gm. of additive/Kgm of clay) to about 50 pounds of additive/short ton of dry clay (24 gm. of additive/Kgm of clay), preferably about 0.05 pound of additive/short ton of dry clay (0.02 gm. of additive/Kgm of clay) to about 24 pounds of additive/short ton of dry clay (12 gm. of additive/Kgm of clay), and most preferably about 0.25 pound of additive/short ton of dry clay (0.12 gm. of additive/Kgm of clay) to about 12 pounds of additive/short ton of dry clay (6.1 gm. of additive/Kgm of clay).

The amount of water added to the clay to produce the hydrated clay composition was determined by observing the power draw

EXAMPLE 1

In laboratory tests, the addition of modified tannins to mixtures of clay and water was compared to mixtures of clay and water or the addition of lignosulfates, known to be a brickmaking additive, to mixtures of clay and water to determine their relative effectiveness in modifying the viscosity of clay/water mixtures. A quantity of 80 grams plus or minus 0.005 gr. of clay was loaded into a Brabender Electronic Plasti-Corder Torque Rheometer. The rheometer had a length of tubing attached to a sample introduction port. The tubing was equipped with a pinch valve to retain in the tubing the amount of additive solution required to hydrate the clay and deliver the additive dosage. The solution was measured into the tubing, the rheometer was activated and allowed to run approximately 45 seconds. The pinch valve was released to admit solution from the tubing into the sample chamber where it mixed with the clay. Torque was recorded for a total of approximately 200 seconds of running time. The data were graphed as torque vs. time using a Microsoft Excel program. A quantity of 0.831 grams of additive was diluted with 100 ml of water to provide an 0.831 percent by weight solution. For each of the runs it was determined that 8.76 mL of this liquid was needed to hydrate the 80 grams of clay thereby providing a 0.1 percent additive dosage based on the dry weight of the clay. A first run was made using tap water as a standard. Three subsequent runs were made adding to the tap water (2) a lignosulfate supplied by Lignotech, USA; Rothchild, Wis., (3) Orfom Grade 2 Tannin, a sulfited quebracho tannin supplied by Phillips Mining Chemicals, Bartlesville, Okla. and (4) Orfom D-3 Tannin, a sulfomethylated quebracho tannin supplied by Phillips Mining Chemicals, Bartlesville, Okla.

Figure 2:
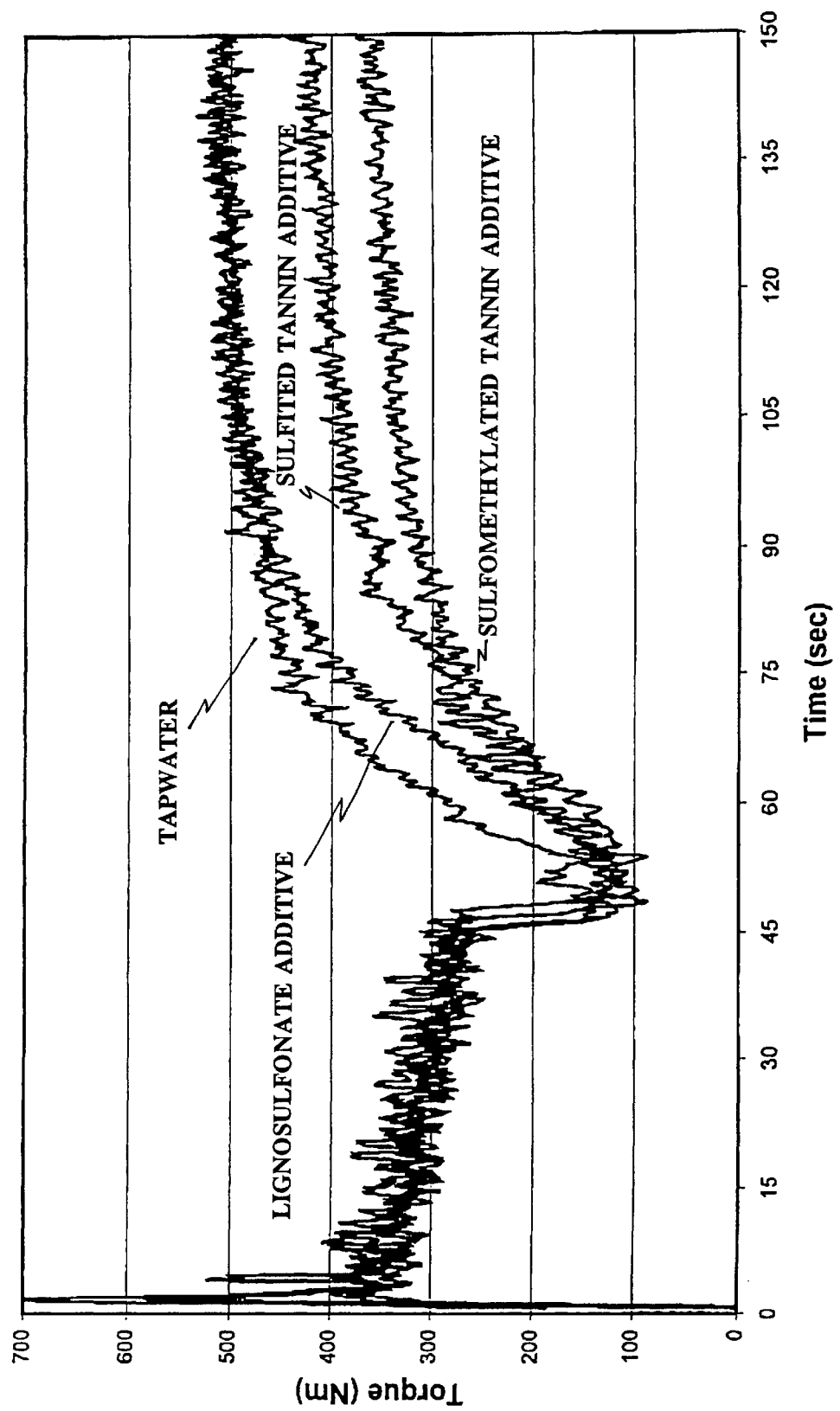
FIG. 2 shows a graphic representation of the torque developed in a process for mixing an extrudable mixture containing water and clay.

The graphed results of the runs are shown in FIG. 2 which indicates the addition of each of the liquids at 45 seconds run time with a subsequent drop in torque followed by an elevation of the torque achieving a steady torque at about 150 seconds. The lignosulfate additive produced a torque about equal to the water standard. The sulfited quebracho tannin additive produced a lower torque than the water standard and the torque produced using the sulfomethylated quebracho tannin was still lower. These data indicate that the modified tannin additives provide a mixture with water and clay having a lower viscosity than a mixture of lignosulfonate, water and clay or water and clay.

These results are representative of a series of runs using these additives in which the same indication of relative viscosity was obtained for mixtures containing these components.

EXAMPLE 2

In a trial run at Acme Brick, Inc. in Tulsa, Okla., approximately 54,000 bricks were produced using the production flow scheme shown in FIG. 1. Bricks were being produced at a steady rate of 1000 bricks/2.3 minutes using a 50 percent active, lignosulfonate additive at a rate of 1.54 gallons/minute, 0.0047 pounds of dry additive/pound of clay, and a water rate of 3.6 gallons/1000 bricks. The additive was changed to Orfom D-3 tannin, a 50 percent active, sulfomethylated quebracho tannin, at the same flow rate of 1.54 gallons/minute, 0.0047 pounds of dry additive/pound of clay, and the same water rate. Brick production continued throughout the trial run at a rate of 2.3 minutes per 1000 bricks. Trial run data appear in the table below.

TABLE I

| Additive[1] | Additive Rate Gal/Min[2] | Water Gal/1000 Bricks | Extruder Amps | Extrusion Rate BPH | Power Used KWH/Min |
|---|---|---|---|---|---|
| A | 1.54 | 3.60 | 350.00 | 25945.9 | 10.28 |
| B | 1.54 | 3.60 | 345.00 | 25,945.90 | 10.13 |
| B | 1.54 | 3.60 | 350.00 | 25,945.90 | 10.28 |
| B | 1.04 | 2.40 | 330.00 | 25,945.90 | 9.69 |
| B | 1.04 | 2.40 | 360.00 | 25,945.90 | 10.57 |
| B | 0.50 | 1.20 | 310.00 | 26,087.00 | 9.06 |

[1] A is lignosulfonate and B is sulfomethylated quebracho tannin
[2] 1.54 gal/min is .0047 pounds of dry additive/pound of clay
1.04 gal/min is .0031 pounds of dry additive/pound of clay
0.50 gal/min is .0015 pounds of dry additive/pound of clay It can be seen that with the change in additive there was an overall decrease in the water added, the extruder amps and the power used by the extruder. The increase in each of these items shown in the next to the last row of the table is attributed to a mechanical problem. There were no signs of sticking or stressing of the bricks as the water rates were decreased. The plasticity of the mixture appeared satisfactory as there were no apparent production problems that could be attributed to the additives. By visual inspection the tannin-containing brick produced showed neither deformation or visible reduction in green strength (by crumbling) in the unfired brick nor cracking or difference in color in the fired brick as compared to the brick made with lignosulfate additive.

Reasonable variations and modifications, which will be apparent to those skilled in the art, can be made within the scope of the disclosure and appended claims without departing from the scope of this invention.

That which is claimed is:

1. A method for producing clay bricks comprising (A) preparing a composition comprising clay, water and an additive chosen from the group consisting of sulfited tannin, sulfomethylated tannin, tannin modified by an esterification reaction, tannin modified by an etherification reaction and mixtures thereof and (B) processing said composition into clay bricks.

2. A method according to claim 1 wherein the additive is sulfited tannin.

3. A method according to claim 2 wherein the additive is sulfited quebracho.

4. A method according to claim 1 wherein the additive is a sulfomethylated tannin.

5. A method according to claim 4 wherein the additive is sulfomethylated quebracho.

6. A method according to claim 1 wherein the additive is present in the composition in a range of about 0.02 pound of additive/short ton of dry clay (0.01 gm. of additive/Kgm of clay) to about 50 pounds of additive/short ton of dry clay (24 gm. of additive/Kgm of clay).

7. A method according to claim 6 wherein the additive is present in the composition in an amount in the range of about 0.05 pound of additive/short ton of dry clay (0.02 gm. of additive/Kgm of clay) to about 24 pounds of additive/short ton of dry clay (12 gm. of additive/Kgm of clay).

8. A method according to claim 7 wherein the additive is present in the composition in an amount in the range of about 0.25 pound of additive/short ton of dry clay (0.12 gm. of additive/Kgm of clay) to about 12 pounds of additive/short ton of dry clay (6.1 gm. of additive/Kgm of clay).

9. A composition useful for the production of clay bricks comprising clay, water and an additive chosen from the group consisting of sulfited tannin, sulfomethylated tannin, tannin modified by an esterification reaction, tannin modified by an etherification reaction and mixtures thereof.

10. A composition according to claim 9 wherein the additive is sulfited tannin.

11. A composition according to claim 10 wherein the additive is sulfited quebracho.

12. A composition according to claim 9 wherein the additive is a sulfomethylated tannin.

13. A composition according to claim 12 wherein the additive is sulfomethylated quebracho.

14. A composition according to claim 9 wherein the additive is present in the composition in a range of about 0.02 pound of additive/short ton of dry clay (0.01 gm. of additive/Kgm of clay) to about 50 pounds of additive/short ton of dry clay (24 gm. of additive/Kgm of clay).

15. A composition according to claim 14 wherein the additive is present in the composition in an amount in the range of about 0.05 pound of additive/short ton of dry clay (0.02 gm. of additive/Kgm of clay) to about 24 pounds of additive/short ton of dry clay (12 gm. of additive/Kgm of clay).

16. A composition according to claim 15 wherein the additive is present in the composition in an amount in the range of about 0.25 pound of additive/short ton of dry clay (0.12 gm. of additive/Kgm of clay) to about 12 pounds of additive/short ton of dry clay (6.1 gm. of additive/Kgm of clay).

17. A clay brick produced using the method of claim 1.
18. A clay brick produced using the method of claim 2.
19. A clay brick produced using the method of claim 3.
20. A clay brick produced using the method of claim 4.
21. A clay brick produced using the method of claim 5.
22. A clay brick produced using the method of claim 6.
23. A clay brick produced using the method of claim 7.
24. A clay brick produced using the method of claim 8.
25. A clay brick produced using the composition of claim 9.
26. A clay brick produced using the composition of claim 10.
27. A clay brick produced using the composition of claim 11.
28. A clay brick produced using the composition of claim 12.
29. A clay brick produced using the composition of claim 13.
30. A clay brick produced using the composition of claim 14.
31. A clay brick produced using the composition of claim 15.
32. A clay brick produced using the composition of claim 16.

33. A method for producing a plastic mixture comprising incorporating an additive chosen from the group consisting of sulfited tannin, sulfomethylated tannin, tannin modified by an esterification reaction, tannin modified by an etherification reaction and mixtures thereof into a plastic mixture comprising clay and water thereby allowing a reduction in the amount of water necessary to provide the mixture with additive a viscosity commensurate with the viscosity of the mixture without the additive.

34. A method according to claim 33 wherein the additive is sulfited tannin.

35. A method according to claim 34 wherein the additive is sulfited quebracho.

36. A method according to claim 33 wherein the additive is a sulfomethylated tannin.

37. A method according to claim 36 wherein the additive is sulfomethylated quebracho.

38. A method according to claim 33 wherein the additive is present in the composition in a range of about 0.02 pound of additive/short ton of dry clay (0.01 gm. of additive/Kgm of clay) to about 50 pounds of additive/short ton of dry clay (24 gm. of additive/Kgm of clay).

39. A method according to claim 38 wherein the additive is present in the composition in an amount in the range of about 0.05 pound of additive/short ton of dry clay (0.02 gm. of additive/Kgm of clay) to about 24 pounds of additive/short ton of dry clay (12 gm. of additive/Kgm of clay).

40. A method according to claim 39 wherein the additive is present in the composition in an amount in the range of about 0.25 pound of additive/short ton of dry clay (0.12 gm. of additive/Kgm of clay) to about 12 pounds of additive/short ton of dry clay (6.1 gm. of additive/Kgm of clay).

* * * * *